United States Patent [19]

Yeshin

[11] 4,006,207

[45] Feb. 1, 1977

[54] MAKING SILICONE RUBBER MOLDS FROM RECLAIMED CURED SILICONE RUBBER PARTICLES AND LIQUID UNCURED SILICONE RUBBER

[75] Inventor: Leon Yeshin, Kitchener, Canada

[73] Assignee: Electrohome Limited, Kitchener, Canada

[22] Filed: Mar. 26, 1975

[21] Appl. No.: 562,210

[52] U.S. Cl. .............................. 264/108; 264/225; 264/DIG. 69

[51] Int. Cl.² .......................................... B29C 1/02

[58] Field of Search ............ 264/225, 37, DIG. 69, 264/337, 338, 343, 241, 108, 112, 113

[56] References Cited

UNITED STATES PATENTS

| | | | |
|---|---|---|---|
| 2,853,742 | 9/1958 | Dasher | 264/DIG. 69 |
| 3,093,443 | 6/1963 | Levinson | 264/37 |
| 3,230,284 | 1/1966 | Iverson | 264/245 |
| 3,527,856 | 9/1970 | Olstowski | 264/343 |
| 3,539,144 | 11/1970 | Krug | 264/338 |
| 3,882,215 | 5/1975 | Dyke et al. | 264/113 |

*Primary Examiner*—Robert F. White
*Assistant Examiner*—James B. Lowe
*Attorney, Agent, or Firm*—Sim & McBurney

[57] ABSTRACT

The cost of a silicone rubber mould is reduced by making it partly from uncured, liquid, castable, silicone rubber and partly from compatible, reclaimed silicone rubber particles. The latter are treated, e.g., with a swelling agent, to decrease their specific gravity below that of the liquid, silicone rubber. When the two rubbers are amalgamated in a mould having an exposed surface of a master to be reproduced, the particles float away from the surface of the master leaving the liquid, silicone rubber, which is permitted to cure, in contact therewith. After curing the resultant silicone rubber mould is stripped from the master.

16 Claims, No Drawings

MAKING SILICONE RUBBER MOLDS FROM RECLAIMED CURED SILICONE RUBBER PARTICLES AND LIQUID UNCURED SILICONE RUBBER

BACKGROUND OF THE INVENTION

This invention relates to processes for making silicone rubber moulds. More particularly, this invention relates to processes for making filled silicone rubber moulds.

Silicone rubber is known to be an excellent material from which to make a mould and has been used for this purpose for many years. Unfortunately, however, silicone rubber is an expensive material, and moulds made therefrom necessarily are expensive. Various attempts have been made in the past to reduce the cost of silicone rubber moulds. For example, attempts have been made to reduce the amount of silicone rubber required by making a part of the mould, more specifically, the back of the mould, from some other material so that the mould consists of back-up material other than silicone rubber to which is adhered a thin layer of silicone rubber. The problem with this technique is in finding a suitable backup material to which the silicone rubber skin will adhere.

SUMMARY OF THE INVENTION

In accordance with this invention there is provided a process for making a silicone rubber mould which comprises providing in a mould having an exposed surface of a master to be reproduced an amalgamation of an uncured, liquid, castable silicone rubber and compatible, reclaimed silicone rubber particles having a specific gravity less than the specific gravity of the liquid, silicone rubber, the surface being below the amalgamation, permitting the compatible, reclaimed silicone rubber particles to float away from said surface of said master leaving said liquid, silicone rubber in contact with said surface, curing said liquid, silicone rubber and removing the resultant silicone rubber mould from said master.

As will be seen from the foregoing, the reclaimed rubber particles float away from the surface of the master. When the uncured, liquid, silicone rubber sets, that portion of the rubber composition in contact with the master is formed from what previously was uncured, liquid, silicone rubber, whilst the cross section of the mould so formed has an increasing concentration of reclaimed silicone rubber. The advantage of this "floatation" is that the surface in contact with the master, being formed of what previously was uncured, liquid, silicone rubber can be used as a casting mould without the appearance of the distortions which would occur when regrind particles of rubber are in close proximity to the casting surface of the mould.

DETAILED DESCRIPTION OF THE INVENTION INCLUDING THE PREFERRED EMBODIMENT

In the practice of this invention it is necessary to provide reclaimed silicone rubber particles having a specific gravity such that they will float in the uncured, liquid, castable silicone rubber.

The reclaimed silicone rubber must be a silicone rubber that will bond to the liquid, castable silicone rubber when it is cured. Such reclaimed silicone rubber will hereinafter be termed compatible reclaimed silicone rubber. Preferably it should be castable or mould-making silicone rubber that has been cured and which may be reclaimed from spent moulds, for example.

A variety of techniques may be employed to obtain compatible, reclaimed rubber of the desired particle size. For example, the compatible, reclaimed rubber can be ground, milled, punched or cut with knives. A wide variation in particle size is possible depending upon the depth of the silicone rubber mould to be made. Typical suitable particle sizes range from particles which pass through a 0.5 mm mesh sieve to those which pass through a 60 mm mesh sieve, but this range is exemplary only. Particles which pass through a 25 mm mesh sieve have been found to be particularly useful.

Particle shape may vary widely. Cubes, prisms and cylinders have been tested successfully. The best possible shape would be a sphere, but this is a difficult shape to obtain from reclaimed rubber.

In order to reduce the specific gravity of the compatible, reclaimed rubber particles to the point that they will float in the uncured, liquid, castable silicone rubber, one technique that has been successfully tested is to treat the compatible, reclaimed rubber particles with a suitable swelling agent for a time sufficient to achieve the desired objective. Swelling agents which can be used are silicone fluids, either alone or in combination with other organic solvents. The silicone liquids may be dialkyl silicone fluids, which are linear polymers having the following formula:

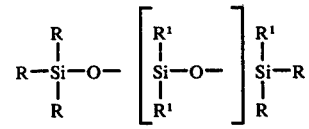

where R is an alkyl group being either methyl, ethyl, butyl, propyl etc. and $R^1$ is also an alkyl group not necessarily the same as R.

Another useful class of silicone fluids consists of polymers having units in which some of the alkyl groups are replaced by other organic groups such as the phenyl radical. This class includes branched chain polymers built up from units derived from methyl trichlorosilane and trimethylchlorosilane.

For the purpose of this invention the most useful silicone fluids are the dimethyl polysiloxane liquids of general formula:

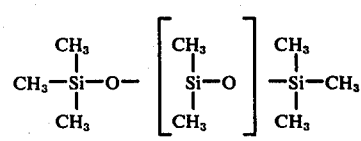

where n = from 1 to 500, these liquids having a molecular weight up to approximately 40,000, a viscosity from 0.2 to 10,000 centistokes at 25° C and a density from 0.75 to 0.98 (n 25/D).

It is not necessary to employ polysiloxanes which are unreactive. Cross-linkable liquids containing (i) a proportion of trifunctional units; and (ii) polymers containing a large proportion of reactive hydrogen atoms such that the repeating units in the polymer are:

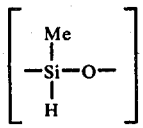

can also be used.

Certain low molecular weight organic solvents act as swelling agents for the compatible reclaimed silicone rubber. Included are esters, glycols, alcohols, ketones, chlorinated solvents, ethers, aromatics, terpenes, and paraffins. However, these materials are fugitive in that they swell the rubber and then depart into the surrounding medium. The rubber then shrinks to its original size. This can cause problems of voids or distortions occurring in the mould. The most useful solvents are the paraffins or aliphatic naphthas having a boiling range from 150° to 600° F (ASTM D-86 1BP) and also petroleum jellies. The most useful naphthas have been found to have a boiling range from 200° F to 400° F and are known by various names such as Iosol (trade mark), mineral spirits, VM + P (trade mark) naphtha, kerosene and Varsol (trade mark). It has been found that the combination of an aliphatic naphtha and silicone oil works very well at concentrations of from one part naphtha per 100 parts silicone oil to 1,000 parts naphtha per 100 parts silicone oil. It would appear that the naphtha swells up the rubber quickly and opens up the polymer matrix so that the higher molecular weight silicone oil can penetrate.

Swelling the compatible, reclaimed rubber particles may be achieved by soaking them in the above described swelling agents, either by complete immersion or by spraying. Temperature is not critical, but swelling time is accelerated by heating the swelling agents above ambient temperature. The time for swelling varies with the particular swelling agent or combination of agents used, but is normally from a few hours to a few days.

In any event, by the aforementioned or other techniques the objective of providing compatible, reclaimed silicone rubber particles having the desired specific gravity is achieved.

The uncured, liquid, silicone rubber to be used in the practice of this invention is any uncured, liquid, castable silicone rubber, i.e., any uncured, liquid mould-making silicone rubber. Typical of those which may be employed are those known as R.T.V. silicone rubbers in the trade. Such R.T.V. silicone rubbers cure from liquids to solids at room temperature or above, generally in the presence of a catalyst. Normally they range in specific gravity from 1.1 to 1.4.

In the practice of the instant invention compatible, reclaimed silicone rubber particles having a specific gravity less than the uncured, liquid, castable silicone rubber to be employed are provided and the two types of rubber then are amalgamated. Two techniques for amalgamation have been successfully tested. In one procedure the swollen, compatible, reclaimed silicone rubber particles are mixed with the uncured, liquid, castable silicone rubber and catalyst, if one is employed, using a mechanical mixer, the mixture is degassed, and the resultant degassed mixture then is poured onto the exposed surface of the master in a mould. Flotation of the compatible, reclaimed rubber particles takes place naturally, and the liquid, silicone rubber is permitted to cure. In the other procedure the swollen, compatible, reclaimed rubber particles are poured onto the exposed surface of the master in a mould followed by the degassed, uncured, liquid, silicone rubber or the degassed, uncured liquid, silicone rubber and catalyst mixture. In the latter technique there is no mechanical mixing of the two types of rubbers. Again flotation of the compatible, reclaimed rubber particles takes place naturally, and the liquid, silicone rubber is permitted to cure.

It will be understood that the term "master" as used above refers to any surface or object that it is desired to reproduce. A "negative" impression of the master is made by the liquid, silicone rubber. When the latter has been cured, it is stripped from the master and incorporated in a mould for making a "positive" reproduction of the master by pouring into the mould liquid plastics such as polyurethanes and polyesters and permitting them to set, all as is well known in the art.

The loading of compatible, reclaimed rubber may vary widely. Obviously the greater the amount of compatible, reclaimed rubber which is employed, the lower will be the cost of the final mould, but also the higher will be the viscosity of the mix. Loadings as high as 60% of compatible, reclaimed rubber based on the total weight of reclaimed and uncured, liquid, castable silicone rubber have been tested successfully, and the preferred loading is from 15% to 60%.

Preferably the size of the rubber particles should be no larger than 50% of the minimum depth of the final silicone rubber mould. This is to ensure that no rubber particles are immediately adjacent the surface of the master. Thus, in the case of a final silicone rubber mould to have varying depths of, say, 25 mm, 20 mm and 12 mm, compatible, reclaimed rubber particles not greater than 6 mm in size preferably should be employed.

Indeed, it can be said that the particle size and loading of compatible, reclaimed rubber particles should be such that the particles are not immediately adjacent any surface of the master and thus cannot adversely affect the faithfulness of the image of the master that is reproduced upon the face of the silicone rubber mould.

It is to be understood that as the liquid, silicone rubber cures, it bonds to the compatible, reclaimed silicone rubber particles, thus avoiding the problem of the prior art hereinbefore noted. Furthermore, because the particles float away from the surface of the master, a highly satisfactory impression of the master can be taken by the liquid, silicone rubber in contact therewith, and yet a silicone rubber mould of reduced cost and required thickness is provided because a part of the previous requirement for liquid, silicone rubber has been met by compatible, reclaimed silicone rubber particles.

The following is one example of the instant invention and is given by way of example only, not by way of limitation:

Using a 3 ton, open back, inclinable press and a 7 mm punch, particles of rubber approximately 5 mm diameter by between 7 mm and 50 mm long were cut from discarded silicone rubber moulds which had been made with both General Electric 664 and Dow Corning (trademarks) "J" materials.

Four kilograms of rubber particles so obtained were then soaked in 5 kg of a blend of 80 parts silicone oil (Dow Corning* 200 Fluid 50 centistokes) and 20 parts Varsol (trade mark) at 20° C for 48 hours. After this time the rubber particles were separated from the swelling agent and drained for 12 hours at 20° C to remove surplus swelling agent.

The particles of reclaimed rubber had at this stage changed in specific gravity from approximately 1.35 to 1.1 average. The swollen particles were added to virgin, catalysed, R.T.V. liquid R.T.V. silicone rubber (General Electric 664) having a specific gravity of 1.35 at a ratio of 30 parts of regrind to 100 parts of virgin. Mixing was accomplished using a dough mixer (Hobart (trademark) Machine Company) for five minutes. The mix was deaerated under vacuum for a further five minutes and then poured onto a master mounted in a retaining wall so that the depth of pour was about 12 mm higher than the highest spot on the master. The mould was allowed to cure overnight at 30° C and then was stripped off of the master.

The resultant mould appeared the same as a regular 100% virgin mould and performed in the same manner. When the mould was sectioned, it was found that the regrind particles had floated to the back of the mould away from the master face which was virgin rubber to a thickness range of 5 mm – 10 mm.

While a preferred embodiment of this invention has been described herein, those skilled in the art will appreciate that changes and modifications may be made thereto without departing from the spirit and scope of the invention as defined in the appended claims.

What I claim as my invention is:

1. A process for making a silicone rubber mould which comprises providing in a mould having an exposed surface of a master to be reproduced an amalgamation of an uncured, liquid, castable silicone rubber and compatible, reclaimed, cured silicone rubber particles having a specific gravity less than the specific gravity of the liquid, silicone rubber, said surface being below said amalgamation, permitting the compatible, reclaimed silicone rubber particles to float away from said surface of said master leaving said liquid, silicone rubber in contact with said surface, curing said liquid, silicone rubber and removing the resultant silicone rubber mould from said master.

2. A process according to claim 1 wherein said liquid, silicone rubber and said reclaimed silicone rubber particles are premixed and poured over said surface of said master.

3. A process according to claim 1 wherein said liquid, silicone rubber and said reclaimed silicone rubber particles are separately introduced into said mould.

4. A process according to claim 3 wherein said reclaimed silicone rubber particles are poured over said surface and said liquid, silicone rubber then is poured over said particles.

5. A process according to claim 1 including the step, prior to introduction of said particles into said mould, of swelling said particles to an extent sufficient to decrease the specific gravity thereof below that of said liquid, silicone rubber.

6. A process according to claim 1 including the step, prior to introduction of said particles into said mould, of swelling said particles to an extent sufficient to decrease the specific gravity thereof below that of said liquid, silicone rubber by soaking said particles with a swelling agent selected from the group consisting of silicone fluids and mixtures of silicone fluids and organic solvents.

7. A process according to claim 1 wherein the size of said particles is between those that will pass through a 0.5 mm mesh sieve and those that will pass through a 60 mm mesh sieve.

8. A process according to claim 1 wherein the size of said particles is such that they will pass through a 25 mm mesh sieve.

9. A process according to claim 1 wherein there is between 15% and 60% by weight of said particles based on the total weight of said particles and said liquid, silicone rubber.

10. A process according to claim 1 wherein the size of said particles is less than 50% of the minimum depth of said silicone rubber mould.

11. A process according to claim 1 wherein said particles have been reclaimed from silicone rubber used for silicone rubber moulds.

12. A process according to claim 1 wherein said liquid, silicone rubber is R.T.V. silicone rubber.

13. A process according to claim 1 wherein the size of said particles is between those that will pass through a 0.5 mm mesh sieve and those that will pass through a 60 mm mesh sieve, and wherein there is between 15% and 60% by weight of said particles based on the total weight of said particles and said liquid, silicone rubber.

14. A process according to claim 1 wherein the size of said particles is between those that will pass through a 0.5 mm mesh sieve and those that will pass through a 60 mm mesh sieve, wherein there is between 15% and 60% by weight of said particles based on the total weight of said particles and said liquid, silicone rubber, and wherein the size of said particles is less than 50% of the minimum depth of said silicone rubber mould.

15. A process according to claim 1 wherein the size of said particles is between those that will pass through a 0.5 mm mesh sieve and those that will pass through a 60 mm mesh sieve, wherein there is between 15% and 60% by weight of said particles based on the total weight of said particles and said liquid, silicone rubber, wherein the size of said particles is less than 50% of the minimum depth of said silicone rubber mould, and wherein said particles have been reclaimed from silicone rubber used for silicone rubber moulds.

16. A process according to claim 1 wherein the size of said particles is between those that will pass through a 0.5 mm mesh sieve and those that will pass through a 60 mm mesh sieve, wherein there is between 15% and 60% by weight of said particles based on the total weight of said particles and said liquid, silicone rubber, wherein the size of said particles is less than 50% of the minimum depth of said silicone rubber mould, wherein said particles have been reclaimed from silicone rubber used for silicone rubber moulds, and wherein said liquid, silicone rubber is R.T.V. silicone rubber.

* * * * *